(12) United States Patent
Shigeno (10) Patent No.: US 8,719,959 B2
(45) Date of Patent: May 6, 2014

(54) CANTILEVER, CANTILEVER SYSTEM, AND PROBE MICROSCOPE AND ADSORPTION MASS SENSOR INCLUDING THE CANTILEVER SYSTEM

(75) Inventor: Masatsugu Shigeno, Chiba (JP)

(73) Assignee: SII Nano Technology Inc., Chiba (JP)

( * ) Notice: Subject to any disclaimer, the term of this patent is extended or adjusted under 35 U.S.C. 154(b) by 543 days.

(21) Appl. No.: 12/548,638

(22) Filed: Aug. 27, 2009

(65) Prior Publication Data

US 2010/0058499 A1 Mar. 4, 2010

(30) Foreign Application Priority Data

Aug. 27, 2008 (JP) .................. 2008-218863

(51) Int. Cl.
*G01N 13/10* (2006.01)
(52) U.S. Cl.
USPC ...................................... 850/21; 850/1; 850/5
(58) Field of Classification Search
USPC ............................................................ 850/21
See application file for complete search history.

(56) References Cited

U.S. PATENT DOCUMENTS

| | | | | |
|---|---|---|---|---|
| 3,215,787 A * | 11/1965 | Hill | ................. | 381/161 |
| 4,638,669 A * | 1/1987 | Chou | ................. | 73/514.25 |
| 4,806,755 A * | 2/1989 | Duerig et al. | ................. | 850/7 |
| 5,079,958 A * | 1/1992 | Takase et al. | ............. | 73/862.625 |
| 5,206,702 A * | 4/1993 | Kato et al. | ................. | 356/493 |
| 6,090,480 A * | 7/2000 | Hayashi | ................. | 428/811.2 |
| 6,422,069 B1 | 7/2002 | Shimizu et al. | | |
| 7,819,011 B2 * | 10/2010 | Hao et al. | ................. | 73/649 |
| 2002/0175273 A1 * | 11/2002 | Moddel et al. | ............. | 250/214 R |
| 2006/0277981 A1 * | 12/2006 | Ohta et al. | ................. | 73/105 |

FOREIGN PATENT DOCUMENTS

| | | |
|---|---|---|
| JP | 05-190617 A | 7/1993 |
| JP | 07-071952 A | 3/1995 |
| JP | 2000-111563 A | 4/2000 |
| JP | 2000-329681 A | 11/2000 |
| JP | 2004-093574 A | 3/2004 |
| JP | 2006-343213 A | 12/2006 |
| JP | 2007-147353 A | 6/2007 |

* cited by examiner

*Primary Examiner* — Phillip A Johnston
(74) *Attorney, Agent, or Firm* — Brinks Gilson & Lione (57) ABSTRACT

A displacement detection portion is provided in a lever portion of a cantilever or between the lever portion and a main body portion. The displacement detection portion is provided by laminating two conductor electrodes to sandwich an insulating portion. A thickness of the insulating portion (electrode interval) is set to a value capable of detecting a variation in tunnel current due to a change in electrode interval which corresponds to a displacement of the lever portion while a predetermined voltage is applied. When the lever portion is slightly displaced, the interval between the conductor electrodes changes. Therefore, the displacement may be detected as the variation in tunnel current at high resolution with sensitivity of an exponential multiple of the change in interval.

28 Claims, 7 Drawing Sheets

CANTILEVER, CANTILEVER SYSTEM, AND PROBE MICROSCOPE AND ADSORPTION MASS SENSOR INCLUDING THE CANTILEVER SYSTEM

RELATED APPLICATIONS

This application claims priority under 35 U.S.C. §119 to Japanese Patent Application No. JP2008-218863 filed on Aug. 27, 2008, the entire content of which is hereby incorporated by reference.

BACKGROUND OF THE INVENTION

1. Field of the Invention

The present invention relates to a self-displacement detection type cantilever having high sensitivity and high resolution, a cantilever system using the cantilever, a probe microscope including the cantilever system, and an adsorption mass sensor including the cantilever system.

2. Description of the Related Art

In recent years, owing to progress in nanotechnology using a semiconductor process, cantilevers having leaf spring characteristics are used in various devices and sensors to conduct various measurements for shape observation, mass, viscoelasticity, magnetic force, and the like. For example, a scanning probe microscope (SPM) includes a cantilever supported in a cantilever state. A surface of a sample is scanned with a probe provided at a tip end of the cantilever. A tunnel current, an interatomic force, a magnetic force, or viscoelasticity, which acts between the probe and the sample is measured as the amount of bending (displacement) of the cantilever. Therefore, surface shapes or physical properties of the sample may be measured for imaging, and hence the cantilever is used in various fields.

Up to now, an optical lever system for measuring a change in reflection angle of a laser beam emitted to a cantilever to obtain a displacement of the cantilever has been used as a system for detecting the amount of bending of the cantilever, that is, the displacement of the cantilever in the scanning probe microscope. In addition to an external detection method using the optical lever system, a probe microscope using a self-displacement detection type cantilever has been proposed.

For example, a system using a piezoresistive cantilever, that is, a self-detection type SPM probe for measuring a variation in resistance value of a piezo-resistor provided on the cantilever to detect the amount of bending of the cantilever is described in JP 2000-111563 A.

A system using a piezoelectric thin film, that is, a tunnel current detecting apparatus for detecting a fine displacement of a cantilever-shaped fine displacement element which includes the piezoelectric thin film and electrodes by the piezoelectric effect of the piezoelectric thin film is described in JP 05-190617 A.

The self-displacement detection type cantilevers have advantages in that the structures are relatively simpler than the structure of the optical lever system and an alignment operation (operation for adjusting laser beam path) specific to the optical lever system is unnecessary.

The conventional technologies still have the following problems.

That is, in the case of the conventional self-displacement detection type cantilevers, there is a problem that a displacement detection signal has lower sensitivity than in the external detection method using the optical lever system and it is difficult to detect the displacement at high resolution. When high-sensitivity detection is to be performed using the conventional self-displacement detection type cantilever, a detection portion of area of 10 µm unit is required. In recent years, in order to realize an increase in resonant frequency band of the cantilever and high-speed scanning, a reduction in size of the cantilever has been advanced. However, the conventional self-displacement detection type cantilevers have limitations, which is a disadvantage.

SUMMARY OF THE INVENTION

The present invention has been made in view of the problems described above. An object of the present invention is to provide a self-displacement detection type cantilever which has high sensitivity and high resolution and still allows reduction in size, a cantilever system using the cantilever, a probe microscope including the cantilever system, and an adsorption mass sensor including the cantilever system.

In order to solve the problems described above, the present invention adopts the following structure. Specifically, a cantilever according to the present invention comprises: a lever portion having a leaf spring characteristic; a main body portion for supporting the lever portion at a base end side of the lever portion; and a displacement detection portion which is provided in the lever portion or between the lever portion and the main body portion and which includes at least one pair of conductor electrode portions applied with a voltage and an insulating portion sandwiched between the conductor electrode portions, the conductor electrode portions being separated at an interval for measuring one of a variation in tunnel current and an electrical change caused by the variation.

The cantilever includes the displacement detection portion which is provided in the lever portion or between the lever portion and the main body portion and which includes at least one pair of conductor electrode portions applied with the voltage and the insulating portion sandwiched between the conductor electrode portions. The pair of conductor electrode portions are separated at the interval for measuring the variation in tunnel current or the electrical change caused by the variation, and hence the tunnel current flowing between the pair of conductor electrode portions when the voltage is applied between the pair of conductor electrode portions is varied significantly in an exponential manner with a distance between the conductor electrode portions which is changed by the displacement of the lever portion. Therefore, even when the lever portion is slightly displaced, the tunnel current flowing between the pair of conductor electrode portions significantly changes. Thus, when the variation in tunnel current or the electrical change due to the variation is measured, high-sensitivity and high-resolution detection may be realized. The displacement detection portion which is a detection portion may have a small area whose one side is approximately 5.0 nm to 0.1 µm, and thus may be applied to the cantilever which is small in size and has high response characteristics.

When the distance between the pair of the conductor electrode portions is changed with the displacement such as bending, of the lever portion, the tunnel current varies. In addition to this, even when a force is applied to the pair of conductor electrode portions by the displacement such as bending, of the lever portion, the tunnel current may be varied depending on a change in electron state. Therefore, the displacement of the lever portion may be measured also by measuring the change in electron state.

In the cantilever according to the present invention, the conductor electrode portions and the insulating portion are laminated in the displacement detection portion, and the displacement detection portion has a laminated surface perpendicular to a virtual plane including a displacement direction of the lever portion and an extending direction of the lever portion. That is, according to the cantilever, the laminated surface of the laminated displacement detection portion is provided perpendicularly to the virtual plane including the displacement direction of the lever portion and the extending direction of the lever portion. Therefore, the lever portion is displaced within the virtual plane. Thus, a force is effectively applied to the displacement detection portion provided perpendicularly to the displacement direction of the lever portion, and hence a large variation in tunnel current may be obtained.

Further, in the cantilever according to the present invention, the displacement detection portions are provided at at least two positions. That is, according to the cantilever, with the displacement detection portions being provided at at least two positions, when one of changes in tunnel currents of the displacement detection portions located at the difference positions is selected or the changes in tunnel currents are compared, higher-precision detection may be realized corresponding to the displacement state of the lever portion.

Further, in the cantilever according to the present invention, the displacement detection portions are provided at a plurality of different positions in the extending direction of the lever portion. That is, according to the cantilever, with the displacement detection portions being provided at the plurality of difference positions in the extending direction of the lever portion, for not only a fundamental frequency but also a second-order or third-order resonant frequency, when the displacement detection portion located at a position suitable for the frequency is selected and the variation in tunnel current or the electrical change due to the variation is detected, the detection depending on a cantilever frequency may be achieved.

Further, in the cantilever according to the present invention, the lever portion comprises a pair of branch support portions separately extending from a tip end side of the lever portion to the base end side thereof, and the displacement detection portions are provided to the pair of branch support portions. That is, according to the cantilever, with the displacement detection portions being provided to the pair of branch support portions, respectively, when variations in tunnel currents detected in the displacement detection portions of the respective branch support portions or electrical changes due to the variations are compared with each other, whether or not the lever portion is twisted may be detected.

The cantilever according to the present invention further comprises a reference portion which is provided close to the lever portion and has the same structure as the displacement detection portion. That is, according to the cantilever, with the reference portion being provided close to the lever portion and having the same structure as the displacement detection portion, when a difference on the variation in tunnel current or the electrical change due to the variation is detected between the displacement detection portion and the reference portion, external factors such as a temperature, a magnetic field, and an electric field may be compensated to achieve displacement detection.

A cantilever system according to the present invention comprises: the cantilever described above; a voltage applying portion for applying the voltage to the displacement detection portion; and a displacement detection mechanism connected to the displacement detection portion, for measuring one of the variation in tunnel current flowing between the conductor electrode portions and the electrical change caused by the variation, to detect a displacement of the lever portion. That is, with the cantilever system including the cantilever described above and the variation in tunnel current of the displacement detection portion or the electrical change due to the variation being measured by the displacement detection mechanism to detect the displacement of the lever portion, various information may be detected at high sensitivity and high resolution based on a very small displacement of the lever portion which is caused by a force applied to the lever portion.

A probe microscope according to the present invention comprises the cantilever system described above. That is, with the probe microscope including the cantilever system described above, and with the cantilever being of a self-displacement detection type and having a cantilever structure simpler than the optical lever system, the probe microscope may measure a surface shape of an object to be measured at high sensitivity and high resolution.

An adsorption mass sensor according to the present invention comprises the cantilever system described above. That is, with the adsorption mass sensor including the cantilever system described above, and with the cantilever being of the self-displacement detection type and having the cantilever structure simpler than the optical lever system, the adsorption mass sensor may measure the mass change that occurs when a substance to be detected is adsorbed to the tip end portion of the lever portion at high sensitivity and high resolution.

According to the present invention, the following effects are obtained.

Specifically, according to the cantilever and the cantilever system of the present invention, the cantilever includes the displacement detection portion which is provided in the lever portion or between the lever portion and the main body portion and which includes the at least one pair of conductor electrode portions applied with the voltage and the insulating portion sandwiched between the conductor electrode portions. The pair of conductor electrode portions are separated at the interval for measuring the variation in tunnel current or the electrical change caused by the variation. Therefore, even when the lever portion is slightly displaced, the tunnel current flowing between the pair of conductor electrode portions significantly changes. Thus, high-sensitivity and high-resolution detection may be realized. Therefore, according to the probe microscope and the adsorption mass sensor using the cantilever and the cantilever system, the cantilever is of the self-displacement detection type and has the cantilever structure simpler than the optical lever system, and hence high-sensitivity and high-resolution measurement may be realized.

DETAILED DESCRIPTION OF THE PREFERRED EMBODIMENTS

Hereinafter, a cantilever, a cantilever system, and a probe microscope according to a first embodiment of the present invention are described with reference to FIGS. 1A and 1B and FIG. 2. The scale of each of the drawings used for the following description is adjusted as appropriate if necessary in order to obtain recognizable sizes of respective members.

Figure 1A:
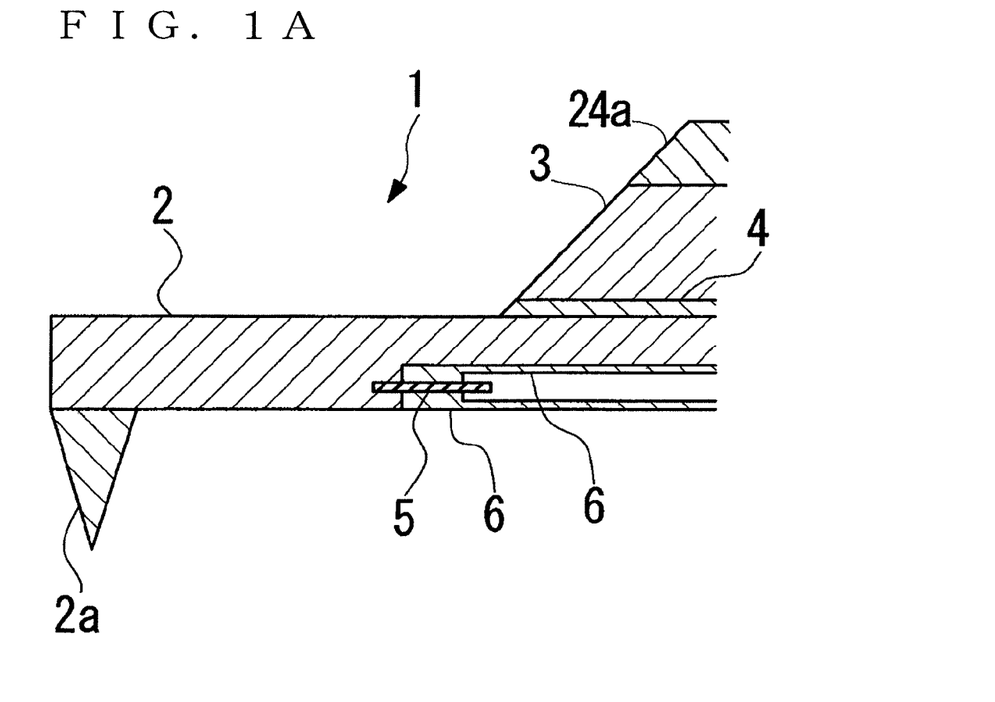
FIGS. 1A and 1B are a cross sectional view illustrating a main part of a cantilever, which may be used for a cantilever system, a probe microscope, and an adsorption mass sensor, according to a first embodiment of the present invention, and a concept view illustrating cross sections of a displacement detection portion before and after bending, respectively.
Figure 1B:
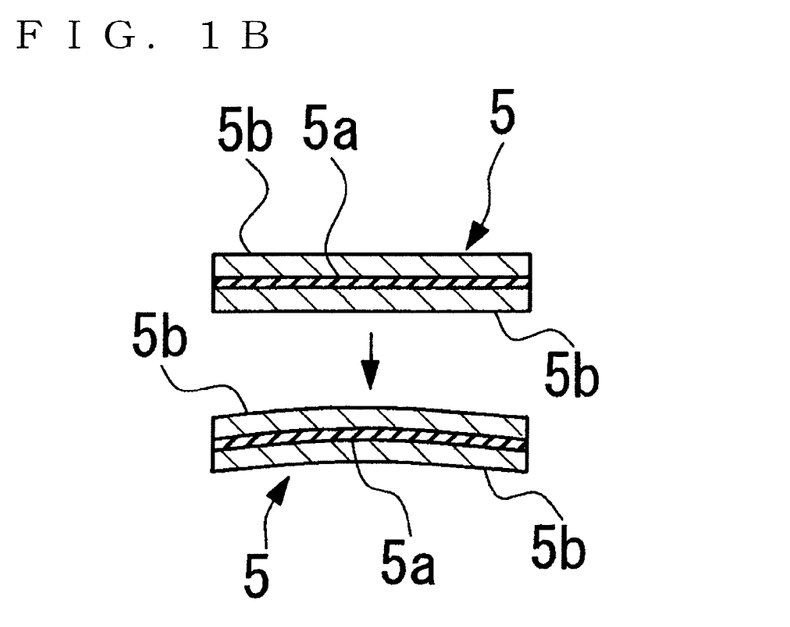
Figure 2:
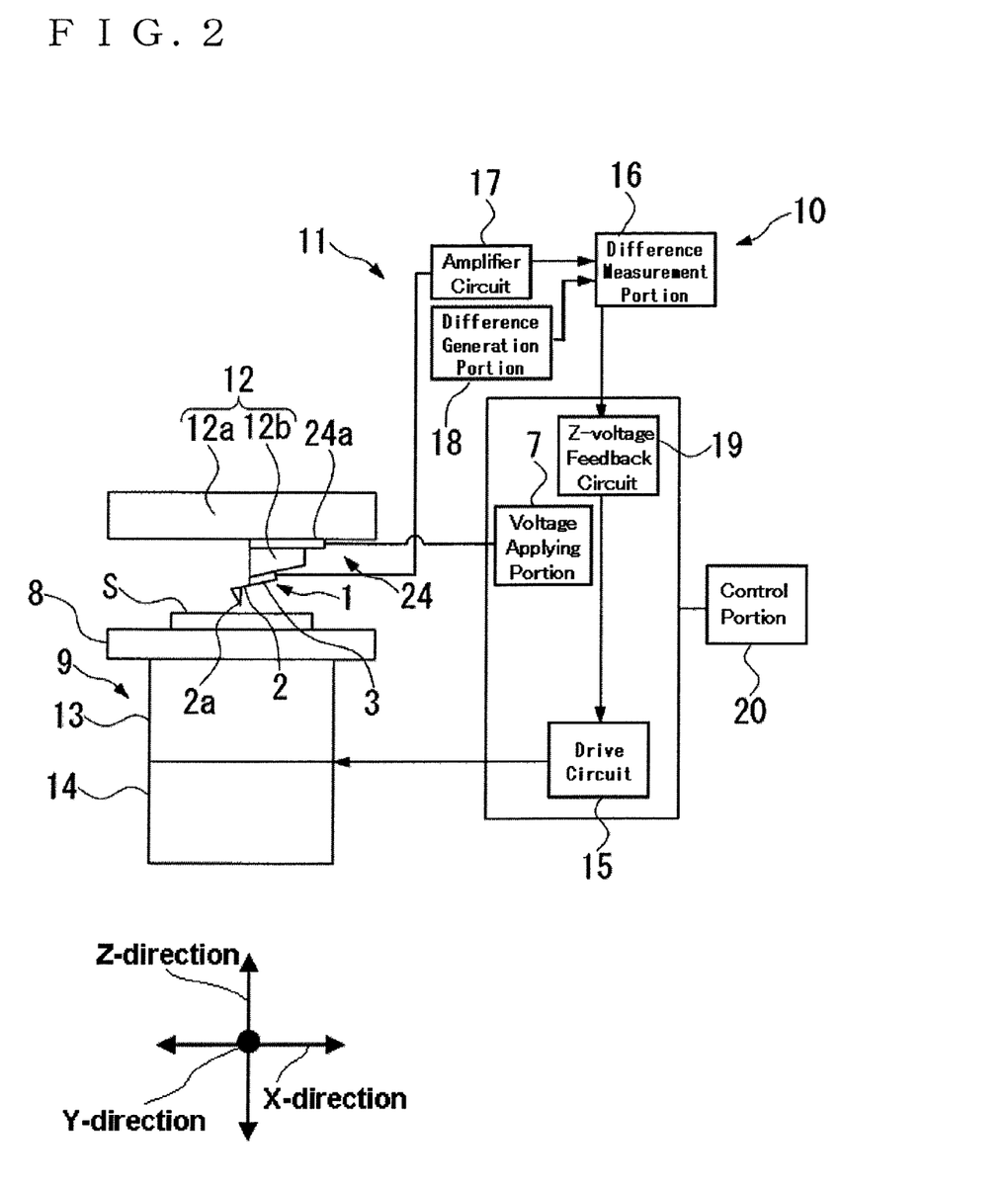
FIG. 2 is an overall structural diagram illustrating a scanning probe microscope according to the first embodiment of the present invention.

As illustrated in FIGS. 1A and 1B, a cantilever 1 according to the first embodiment includes a lever portion 2 having a leaf spring characteristic, a main body portion 3 for supporting the lever portion 2 on a base end side of the lever portion 2 in a cantilever state, a cantilever vibrating portion 24a provided in the lever portion 2 or between the lever portion 2 and the main body portion 3, for vibrating the lever portion 2, a displacement detection portion 5, and wiring portions 6. The displacement detection portion 5 is provided in the lever portion 2 or between the lever portion 2 and the main body portion 3, and includes an insulating portion 5a and a pair of conductor electrode portions 5b sandwiching the insulating portion 5a. A voltage is applied between the conductor electrode portions 5b. The conductor electrode portions 5b are separated at an interval capable of measuring a variation in tunnel current or an electrical change due to the variation. The wiring portions 6 are connected to the pair of conductor electrode portions 5b. In the cantilever 1 according to this embodiment, which is employed for the probe microscope, a probe 2a is provided on a tip end side of the lever portion 2.

The displacement detection portion 5 is formed by laminating the conductor electrode portions 5b and the insulating portion 5a. A laminated surface of the displacement detection portion 5 is provided perpendicularly to a virtual plane including a displacement direction of the lever portion 2 (or protruding direction of probe 2a) and an extending direction of the lever portion 2. That is, in this embodiment, the laminated surface of the displacement detection portion 5 is provided along the extending direction of the lever portion 2. Therefore, when a bending force of the lever portion 2 is applied in a direction perpendicular to the laminated surface of the displacement detection portion 5, the displacement detection portion 5 is bent or distorted together with the lever portion 2.

The displacement detection portion 5 is desirably provided at a base end portion of the lever portion 2 or between the lever portion 2 and the main body portion 3 so as to effectively receive the bending force of the lever portion 2.

The lever portion 2 is formed into, for example, a substantially rectangular plate shape by a semiconductor process. For example, an oxide layer (silicon oxide film) 4 is formed on the main body portion 3 which is a silicon support layer. Then, a silicon-on-insulator (SOI) substrate including silicon active layers which are thermally bonded to each other on the oxide layer 4 is used to remove the silicon support layer, and hence the lever portion 2 is formed in a thin plate shape on the oxide layer 4. The probe 2a is protruded from the surface of the tip end portion of the lever portion 2 by an etching technique to have a sharp tip end shape. The present invention is not limited to the use of the SOI substrate. The lever portion 2 and the main body portion 3 may be formed using other materials or methods.

A distance between the pair of conductor electrode portions 5b is set to a range of 0.3 nm to 20 nm. The reason why the distance is set to a value equal to or larger than 0.3 nm is that a distance corresponding to several atoms is a limit in terms of a current manufacturing technology. The reason why the distance is set to a value equal to or smaller than 20 nm is that 20 nm is a tunnel current detection limit.

The insulating portion 5a is made of an insulating material or a vacuum gap. For example, the insulating material to be employed may be a self-assembly film, a Langmuir-Blodgett (LB) film, an evaporation film, a sputtering film, amphipathic molecule, a metal oxide film, magnetism oxide, aluminum oxide, titanium oxide, or tantalum oxide. A more specific example of the displacement detection portion 5 has a structure in which the insulating portion 5a which is formed on a Si substrate at a thickness of 2 nm by sputtering and made of MgO is sandwiched between the pair of conductor electrode portions 5b made of CoFeB.

The wiring portions 6 are, for example, pattern wirings made of aluminum or copper.

The scanning probe microscope including the cantilever 1 according to this embodiment is an apparatus for measuring surface shapes or various physical properties of a sample S. As illustrated in FIG. 2, the scanning probe microscope includes the cantilever 1, a lever vibrating mechanism 24 for vibrating the lever portion 2, a stage 8 on which the sample S is set, a moving mechanism 9 for moving the stage 8 relatively to the cantilever 1, and a displacement detection mechanism 10 connected to the displacement detection portion 5, for measuring the variation in tunnel current flowing between the conductor electrode portions 5b or the electrical change due to the variation to detect the displacement of the lever portion 2. The cantilever 1, a voltage applying portion 7, and the displacement detection mechanism 10 serve as a cantilever system 11.

The cantilever 1 is set on a cantilever holder 12 so as to be opposed to the sample S located on the stage 8. The cantilever 1 is fixed such that the lever portion 2 is tilted at a predetermined angle with respect to a surface of the sample S by a slope block 12b provided on a cantilever attachment side surface of the cantilever holder 12 through the cantilever vibrating portion 24a.

The lever vibrating mechanism 24 includes the cantilever vibrating portion 24a provided between a holder main body 12a and the slope block 12b, and the voltage applying portion 7 for supplying an alternating current voltage (vibration voltage) to the cantilever vibrating portion 24a.

The cantilever vibrating portion 24a is, for example, a piezoelectric element driven with the applied vibration voltage, for vibrating the cantilever 1 with a desired amplitude amount in a thickness direction at a predetermined frequency.

The cantilever vibrating portion 24a is fixed to the cantilever attachment side surface of the holder main body 12a. The slope block 12b is fixed to a lower surface of the cantilever vibrating portion 24a such that a set surface of the slope block 12b faces the sample S side. The main body portion 3 of the cantilever 1 is set on the set surface. The slope block 12b is fixed to the main body portion 3 of the cantilever 1 by, for example, a wire.

The voltage applying portion 7 has a function of applying the vibration voltage to the cantilever vibrating portion 24a connected thereto through connection terminals (not shown) to vibrate the cantilever vibrating portion 24a, thereby periodically deforming and vibrating the lever portion 2.

According to the scanning probe microscope including the lever vibrating mechanism 24, the stability of vibration characteristics of the lever portion 2 may be improved by the lever vibrating mechanism 24, and hence the measurement precision of the surface shape of the sample S may be improved.

The moving mechanism 9 includes an XY-scanner 13 on top of which the stage 8 is set, a Z-scanner 14 on top of which the XY-scanner 13 is set, a vibration isolation table (not shown) on which the Z-scanner 14 is set, and a drive circuit 15 for applying driving voltages to the XY-scanner 13 and the Z-scanner 14.

Each of the XY-scanner 13 and the Z-scanner 14 is, for example, a piezoelectric element. When a voltage is applied from the drive circuit 15, the XY-scanner 13 finely moves in an XY-direction parallel to the surface of the sample S based on the amount of applied voltage and the polarity. When a voltage is applied from the drive circuit 15, the Z-scanner 14 finely moves in a Z-direction perpendicular to the surface of the sample S based on the amount of applied voltage and the polarity.

The pair of wiring portions 6 are connected to an amplifier circuit 17. The amplifier circuit 17 detects a tunnel current flowing through the displacement detection portion 5 when a detection voltage is applied between the pair of conductor electrode portions 5b of the displacement detection portion 5, amplifies an output signal corresponding to the detected tunnel current, and outputs the output signal to a difference measurement portion 16.

The difference measurement portion 16 receives not only the output signal from the amplifier circuit 17 and but also a reference signal from a reference generation portion 18. The reference signal is, for example, a signal for setting the output of the difference measurement portion 16 to "0" when the amount of displacement of a vibration state of the lever portion 2 is "0". The difference measurement portion 16 compares the reference signal with the output signal sent from the amplifier circuit 17 and outputs an error signal indicating a difference between the signals to a Z-voltage feedback circuit 19. That is, the error signal is a signal corresponding to the amount of displacement of the vibration state of the lever portion 2. Therefore, when the error signal is monitored, the amount of displacement of the vibration state of the lever portion 2 may be measured.

In other words, the amplifier circuit 17, the difference measurement portion 16, and the reference generation portion 18 serve as the displacement detection mechanism 10 for applying the detection voltage to the displacement detection portion 5 and for measuring the amount of the displacement of the vibration state of the lever portion 2 based on the variation in tunnel current flowing through the displacement detection portion 5.

The Z-voltage feedback circuit 19 is connected to a control portion 20. With the control portion 20, the surface shapes of the sample S may be measured based on the error signal and a change in phase of a vibration frequency may be detected to measure various physical property information (for example, magnetic force or potential).

In other words, the Z-voltage feedback circuit 19 and the control portion 20 becomes a control structure for obtaining measurement data and controlling the moving mechanism 9 during scanning, so as to maintain a constant state in distance between probe 2a and the surface of sample S and a vibration of lever portion 2. The control portion 20 comprehensively controls all the constituent elements described above.

Next, a measurement method using the scanning probe microscope according to this embodiment is described.

The detection voltage is applied from the displacement detection mechanism 10 to the displacement detection portion 5 to monitor the tunnel current flowing through the displacement detection portion 5. In this state, the sample S is scanned. In this case, the lever portion 2 in the vibration state is displaced by an interatomic force acting between the probe 2a and the sample S. Therefore, as illustrated in FIG. 1B, the displacement detection portion 5 is bent or distorted according to the amount of displacement, whereby the distance between the pair of conductor electrode portions 5b. Thus, the tunnel current flowing between the pair of conductor electrode portions 5b changes. The amplifier circuit 17 outputs the output signal corresponding to the variation in tunnel current to the difference measurement portion 16.

The difference measurement portion 16 compares the output signal sent from the amplifier circuit 17 with the reference signal sent from the reference generation portion 18, calculates the error signal corresponding to the amount of displacement of the vibration state of the lever portion 2, and outputs the error signal to the Z-voltage feedback circuit 19. Therefore, the Z-voltage feedback circuit 19 may measure the amount of displacement of the vibration state of the lever portion 2.

Then, the Z-voltage feedback circuit 19 controls the drive circuit 15 to move the stage 8 in the Z-direction based on the error signal, thereby maintaining the distance between the probe 2a and the surface of the sample S to a constant value. That is, the stage 8 is controlled such that the error signal is brought close to "0".

As a result, during scanning, a height of the cantilever 1 may be controlled such that the detected amount of the displacement of the vibration state of the lever portion 2 is maintained to a constant value, and hence the sample S may be subjected to dynamic force mode (DFM) microscope measurement as resonant mode measurement.

As described above, the cantilever 1 according to this embodiment includes the displacement detection portion 5 which is provided in the lever portion 2 and includes the insulating portion 5a and the pair of conductor electrode portions 5b sandwiching the insulating portion 5a. The pair of conductor electrode portions 5b are separated at the interval which enables measuring the variation in tunnel current or the electrical change due to the variation when a voltage is applied between the conductor electrode portions 5b. Therefore, the tunnel current flowing between the pair of conductor electrode portions 5b when the voltage is applied therebetween is exponentially varied with the distance between the pair of conductor electrode portions 5b which is changed by the displacement of the lever portion 2.

Therefore, even when the lever portion 2 is slightly displaced, the tunnel current flowing between the pair of conductor electrode portions 5b significantly changes. Thus, when the variation in tunnel current or the electrical change due to the variation is measured, high-sensitivity and high-resolution detection may be realized. The displacement detection portion 5 which is a detection portion may have a small area whose one side is approximately 5.0 nm to 0.1 μm, and thus may be applied to the cantilever 1 which has high response characteristics and a small size in which a lever width is set to 100 nm and a lever length is set to approximately 1 μm.

The laminated surface of the laminated displacement detection portion 5 is provided perpendicularly to the virtual plane including the displacement direction of the lever portion 2 (or protruding direction of probe 2a) and the extending direction of the lever portion 2. The lever portion 2 is displaced within the virtual plane. Therefore, a force is effectively applied to the displacement detection portion 5 provided perpendicularly to the displacement direction of the lever portion 2, and hence a large variation in tunnel current may be obtained.

Next, cantilevers, cantilever systems, and probe microscopes according to second to sixth embodiments of the present invention are described below with reference to FIGS. 3A, 3B, 4, 5, 6, and 7. In each of the following embodiments, the same constituent portions as in the first embodiment are expressed by the same reference symbols and the description thereof is omitted.

Figure 3A:
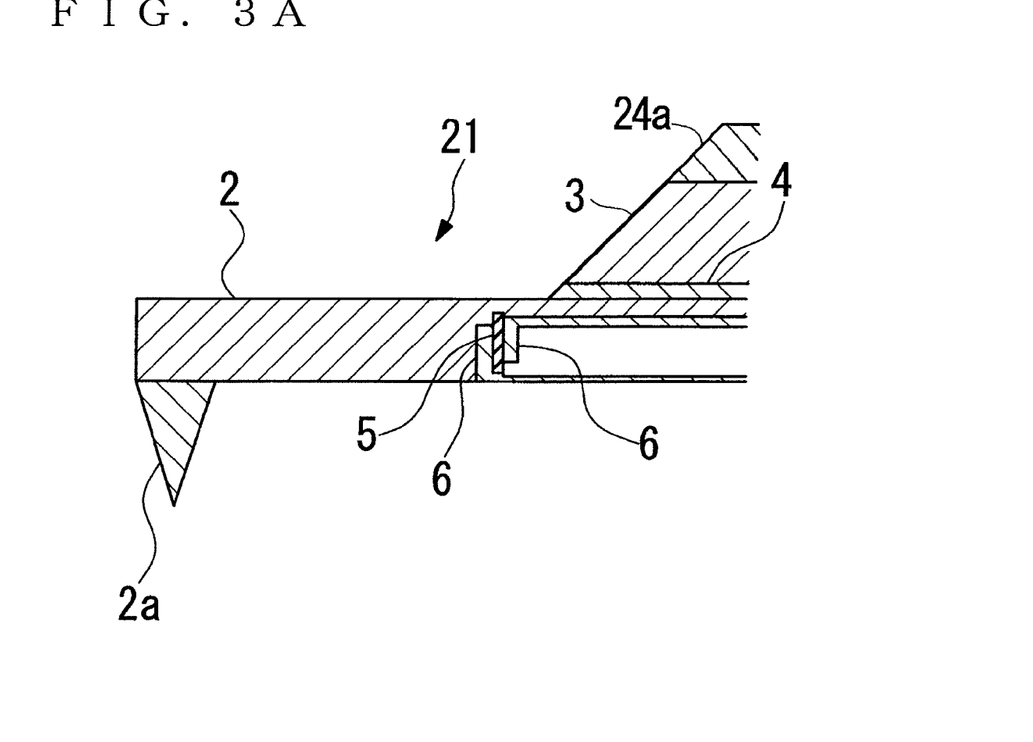
FIGS. 3A and 3B are a cross sectional view illustrating a main part of a cantilever, which may be used for a cantilever system and a probe microscope, according to a second embodiment of the present invention, and a concept view illustrating cross sections of a displacement detection portion before and after bending, respectively.

A difference between the second embodiment and the first embodiment is as follows. In the first embodiment, the laminated surface of the displacement detection portion 5 is provided along the extending direction of the lever portion 2. In contrast to this, in a cantilever 21 according to the second embodiment, as illustrated in FIG. 3A, the laminated surface of the displacement detection portion 5 is provided perpendicularly to the extending direction of the lever portion 2. That is, even in the cantilever 21 according to the second embodiment, the laminated surface of the displacement detection portion 5 is provided perpendicularly to the virtual plane including the displacement direction of the lever portion 2 (or protruding direction of probe 2a) and the extending direction of the lever portion 2. Therefore, a force is effectively applied to the displacement detection portion 5.

Figure 3B:
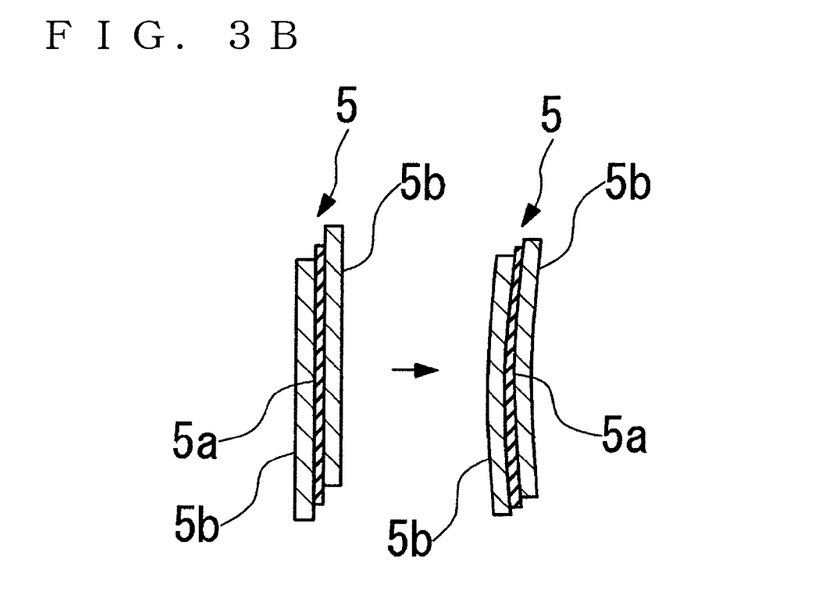

When the lever portion 2 is bent, the displacement detection portion 5 is also effectively bent as illustrated in FIG. 3B, whereby the distance between the conductor electrode portions 5b changes and the tunnel current also changes. Therefore, the displacement of the lever portion 2 may be detected at high sensitivity and high resolution as in the first embodiment.

Figure 4:
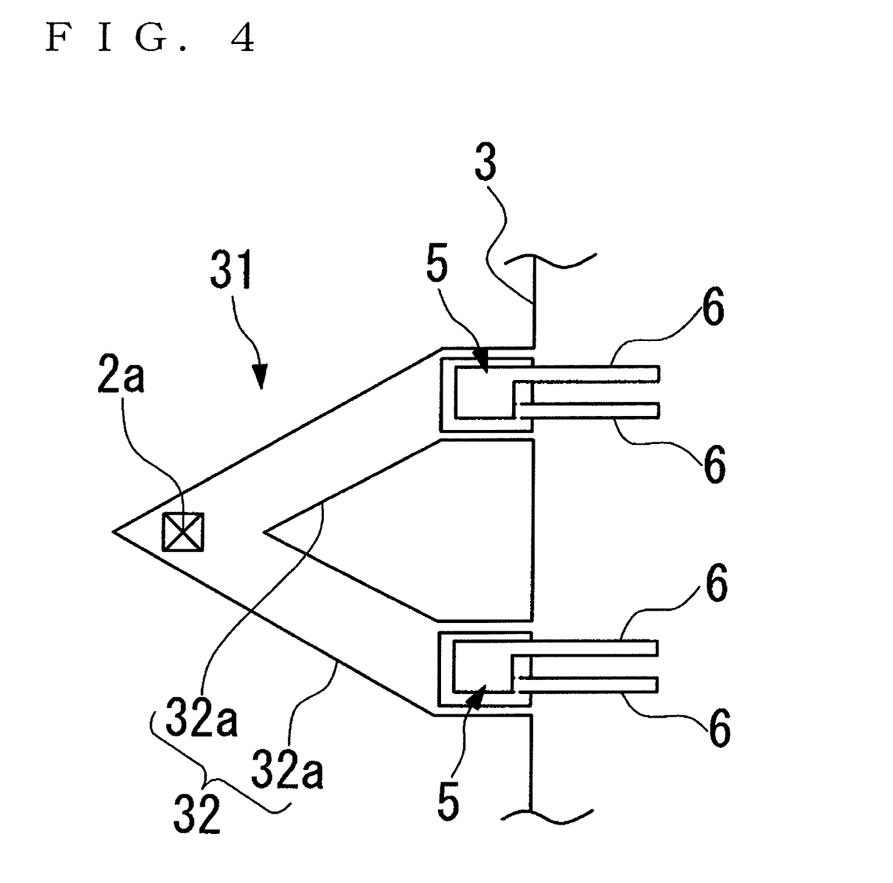
FIG. 4 is a plan view illustrating a main part of a cantilever, which may be used for a cantilever system and a probe microscope, according to a third embodiment of the present invention.

A difference between the third embodiment and the first embodiment is as follows. In the first embodiment, the single displacement detection portion 5 is provided at the base end portion of the lever portion 2 having the substantially rectangular plate shape. In contrast to this, in a cantilever 31 according to the third embodiment, as illustrated in FIG. 4, a lever portion 32 is branched into a pair of branch support portions 32a extending from the tip end portion at which the probe 2a is provided to the base end side. The displacement detection portion 5 is provided to each of the pair of branch support portions 32a.

In other words, in the third embodiment, the lever portion 32 is formed into a V-shape including the pair of branch support portions 32a. The displacement detection portions 5 are provided at respective base end portions of the right and left branch support portions 32a. When the lever portion 32 is twisted, variations in tunnel currents in the displacement detection portions 5 of the right and left branch support portions 32a are different from each other. Therefore, in the cantilever 31 according to the third embodiment, the displacement detection portion 5 is provided to each of the pair of branch support portions 32a. Thus, when variations in tunnel currents detected in the displacement detection portions 5 of the respective branch support portions 32a or electrical changes due to the variations are compared with each other, whether or not the lever portion 32 is twisted may be detected.

Figure 5:
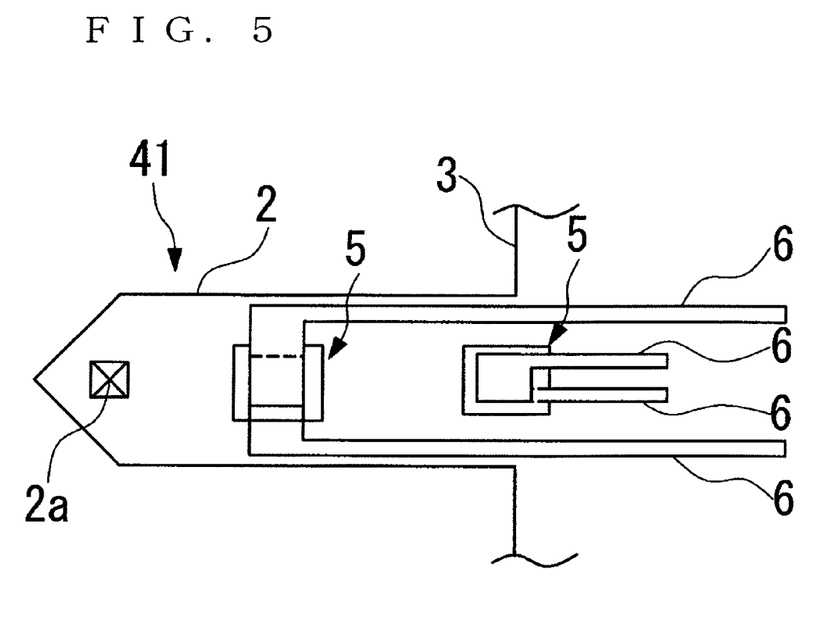
FIG. 5 is a plan view illustrating a main part of a cantilever, which may be used for a cantilever system and a probe microscope, according to a fourth embodiment of the present invention.

A difference between the fourth embodiment and the first embodiment is as follows. In the first embodiment, the single displacement detection portion 5 is provided at the base end portion of the lever portion 2 having the substantially rectangular plate shape. In contrast to this, in a cantilever 41 according to the fourth embodiment, as illustrated in FIG. 5, the displacement detection portions 5 are provided at two different positions in the extending direction of the lever portion 2. That is, in the fourth embodiment, the displacement detection portions 5 are provided at the two positions corresponding to the base end portion and intermediate portion of the lever portion 2.

In the cantilever 41 according to the fourth embodiment, the displacement detection portions 5 are provided at the two different positions in the extending direction of the lever portion 2. Therefore, in a case of not only a fundamental frequency but also a second-order or third-order resonant frequency, when the displacement detection portion 5 located at a position suitable for the frequency is selected and a variation in tunnel current or an electrical change due to the variation is detected, the detection according to the cantilever frequency may be achieved. In the fourth embodiment, the displacement detection portions 5 are provided at the two positions corresponding to the base end portion and intermediate portion of the lever portion 2. The displacement detection portions 5 may be provided at at least three positions.

Figure 6:
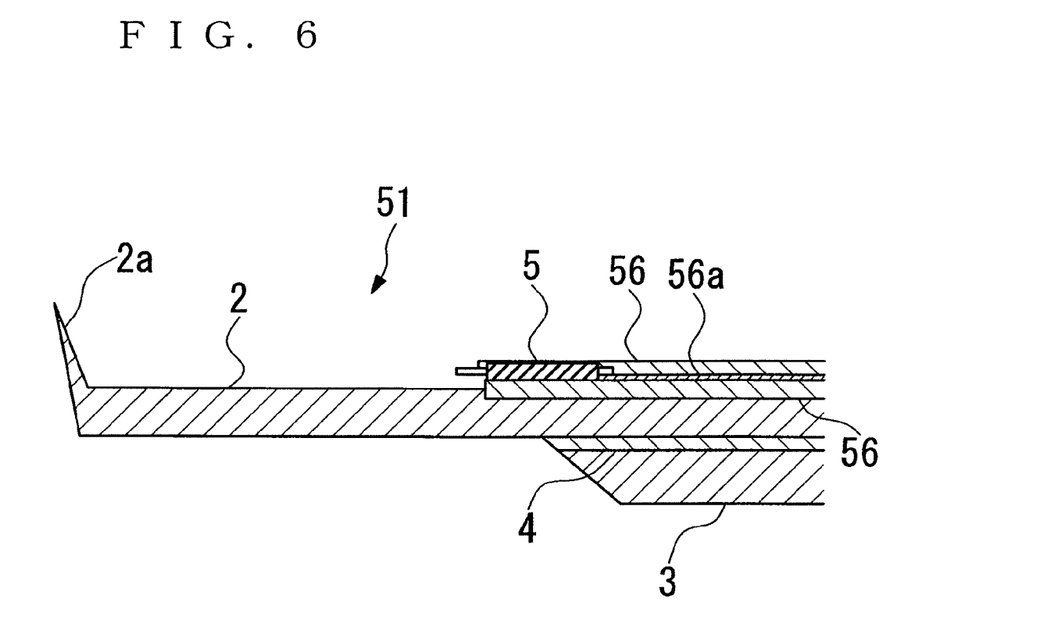
FIG. 6 is a cross sectional view illustrating a main part of a cantilever, which may be used for a cantilever system and a probe microscope, according to a fifth embodiment of the present invention.

A difference between the fifth embodiment and the first embodiment is as follows. In the first embodiment, the displacement detection portion 5 is provided at the base end portion of the lever portion 2. In contrast to this, in a cantilever 51 according to the fifth embodiment, as illustrated in FIG. 6, the displacement detection portion 5 is provided such that the center thereof is located at a support end of the lever portion 2, that is, a tip end of the main body portion 3. In the fifth embodiment, a pair of wiring portions 56 connected to the conductor electrode portions 5b have a laminated structure produced by a semiconductor process. The pair of wiring portions 56 sandwiching an insulating layer 56a are successively laminated over the lever portion 2 and the main body portion 3.

As described above, in the cantilever 51 according to the fifth embodiment, the displacement detection portion 5 is provided such that the center thereof is located at the support end of the lever portion 2. Therefore, the force of the bent lever portion 2 most effectively acts on the displacement detection portion 5, and hence a larger variation in tunnel current may be obtained and high-sensitivity and high-resolution measurement may be realized.

Figure 7:
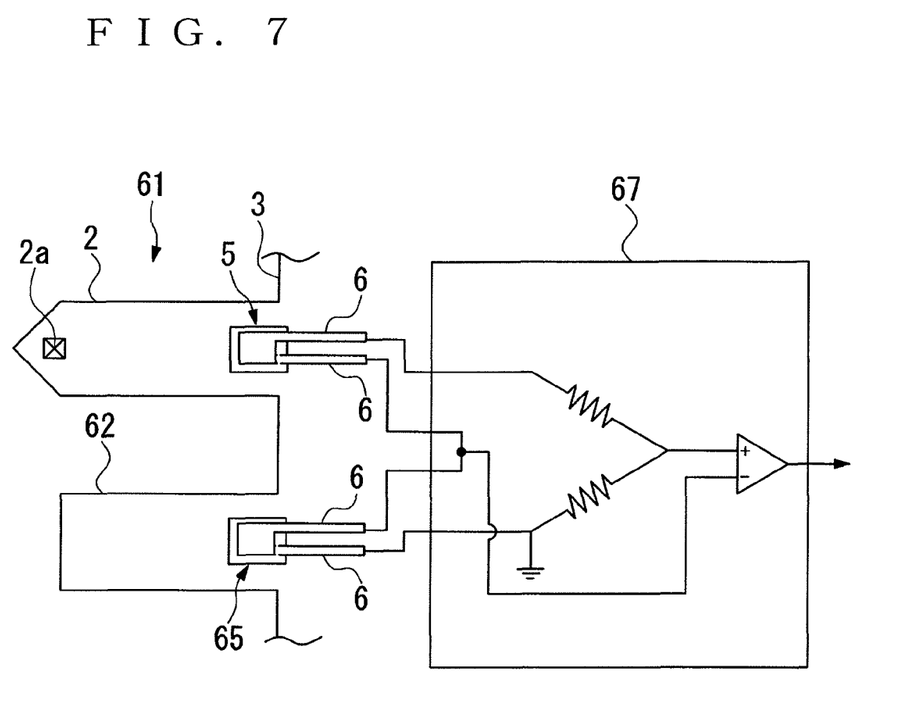
FIG. 7 illustrates a combination of a plan view of a cantilever, which may be used for a cantilever system and a probe microscope, according to a sixth embodiment of the present invention, and a circuit diagram of a Wheatstone bridge circuit.

A difference between the sixth embodiment and the first embodiment is as follows. In the first embodiment, the main body portion 3 is provided with the single lever portion 2 and the single displacement detection portion 5 formed in the single lever portion 2. In contrast to this, in a cantilever 61 according to the sixth embodiment, as illustrated in FIG. 7, a reference portion 65 having the same structure as the displacement detection portion 5 is provided close to the lever portion 2. That is, in the sixth embodiment, a reference protruding portion 62 which is located close to the lever portion 2 and has the same material and laminated structure as the lever portion 2 is supported by the main body portion 3 in the cantilever state. The reference portion 65 is formed at a base end of the reference protruding portion 62.

In the sixth embodiment, the conductor electrode portions 5b of the displacement detection portion 5 and the conductor electrode portions 5b of the reference portion 65 are connected to a Wheatstone bridge circuit 67 instead of the amplifier circuit 17.

The Wheatstone bridge circuit 67 compares tunnel currents flowing through the displacement detection portion 5 and the reference portion 65 with each other to calculate a difference therebetween, amplifies an output signal corresponding to a current value of the calculated difference, and then the amplified output signal to the difference measurement portion 16. In other words, the displacement detection mechanism 10 in this case measures the amount of the displacement of the vibration state of the lever portion 2 based on the variation in differential tunnel current.

In the displacement detection portion 5, the tunnel current is varied even by, for example, a change in temperature, in addition to the displacement of the lever portion 2. However, the Wheatstone bridge circuit 67 monitors the tunnel current flowing between the conductor electrode portions 5b of the reference portion 65, and hence an unnecessary tunnel current variation component generated by the change in temperature may be cancelled to eliminate the influence of temperature. Therefore, temperature compensation may be achieved, and hence the sample S may be measured at higher precision to improve reliability of results obtained by measurement.

Two of the four wiring portions 6 which are connected to the displacement detection portion 5 and the reference portion 65 are ground terminals. The two wiring portions 6 may be combined at an arbitrary position such that the ground terminal portions serve as the common wiring portion 6. Even in this case, the same operation and effect may be obtained.

When the reference portion 65 is used for compensation, the reference protruding portion 62 which is higher in resonant frequency than the lever portion 2 is desirably provided. With this structure, the reference protruding portion 62 may be prevented from being resonated at a frequency equal to or smaller than the resonant frequency of the lever portion 2. Thus, stable operation may be achieved.

When the reference protruding portion 62 is equal in thickness to the lever portion 2, a length of the reference protruding portion 62 is desirably made shorter than the length of the lever portion 2. However, when the length of the reference protruding portion 62 is excessively short, a thermal characteristic difference occurs. Therefore, the length of the reference protruding portion 62 is desirably set within a range of $\frac{1}{5}$ to $\frac{4}{5}$ of the length of the lever portion 2.

As described above, in the cantilever 61 according to the sixth embodiment, the reference portion 65 having the same structure as the displacement detection portion 5 is provided close to the lever portion 2. Therefore, a difference on the variation in tunnel current or the electrical change due to the variation is detected between the displacement detection portion 5 and the reference portion 65, whereby external factors such as a temperature, a magnetic field, and an electric field may be compensated to achieve displacement detection.

The technical scope of the present invention is not limited to the respective embodiments described above, and thus various modifications may be made without departing from the scope of the present invention.

For example, in each of the embodiments, the scanning probe microscope using the cantilever and the cantilever system according to the present invention is described. An adsorption mass sensor including the cantilever and the cantilever system according to any one of the embodiments may be used as another apparatus.

In this case, the adsorption mass sensor has the same structure as the scanning probe microscope illustrated in FIG. 1A. When the apparatus is operated as the adsorption mass sensor, for example, a material which interacts with a substance to be detected is provided in advance in the probe 2a of the cantilever 1.

Accordingly, when the substance is adsorbed or adhered to the lever portion, the lever portion is bent by a change in vibration frequency of the lever portion due to a change in weight of the lever portion. Thus, the mass of the adsorbed or adhered substance or the amount of adsorbed or adhered substance may be measured based on the variation in tunnel current of the displacement detection portion, which corresponds to the amount of bending (displacement) at this time. For example, when the lever portion is coated with a polymer thin film adsorbing an organic compound molecule which is a specific gas component contained in a gas, the adsorption mass sensor may be operated as a gas sensor capable of detecting the specific gas component contained in the gas.

More specifically, for example, D-phenylalanine, polyethlene, or polychlorotrifluoroethylene is used as a target material. A plasma organic thin film is formed as an adsorbing film on a surface of the tip end portion of the lever portion by a high-frequency sputtering method. A gas sample having a saturated water vapor pressure in a water vapor saturation layer maintained at a predetermined temperature and a saturated vapor pressure is guided to the lever portion. A predetermined relative humidity is set to maintain a steady state of a water component adsorbed to the surface of the organic thin film. After that, the resonant frequency of the lever portion 2 is measured. In this manner, an adsorption mass sensor for detecting and recognizing a volatile sulfide (on the order of ppm or less) causing bad breath may be provided.

As described above, according to the adsorption mass sensor in the present invention, the cantilever is of the self-displacement detection type and has the cantilever structure simpler than the optical lever system. Therefore, the change in mass in the case where the substance to be detected is adsorbed to the lever portion may be measured at high sensitivity and high resolution.

When the cantilever and the cantilever system according to the present invention are employed for the adsorption mass sensor, the probe of the lever portion is not necessarily provided.

In each of the embodiments described above, the scanning probe microscope having the vibration mode for performing measurement while the cantilever according to the present invention is vibrated is adopted. The present invention may be applied to a scanning probe microscope in which the cantilever is not vibrated at measurement.

What is claimed is:

1. A cantilever for use in a detecting device which is configured to perform a detection based on mechanical stress caused in the cantilever, comprising:
at least one lever defined in the cantilever and extending in a direction in a lever plane in which the cantilever is expected to be bent, wherein the at least one lever comprises a point of operation at a first end portion and a base end at a second end portion that is opposite to the first end portion in the extending direction of the at least one lever, and at least one stress sensor formed by laminating two electrodes with an electrical insulator therebetween and provided to the at least one lever to receive the bending force of said lever, the at least one stress sensor being configured to be responsive to mechanical stress caused in the cantilever by a change of a vibration amplitude of the lever to flow a tunnel current across the two electrodes, wherein the tunnel current is a function of a distance between the two electrodes which is variable by the mechanical stress.

2. The cantilever according to claim 1, wherein the distance between the two electrode falls within a range between about 0.3 nm to about 20 nm.

3. The cantilever according to claim 1, wherein the electrical insulator comprises a vacuum gap.

4. The cantilever according to claim 1, wherein the electrical insulator comprises an insulating material selected from a group consisting of a self-assembly film, a Langmuir-Blodgett film, an evaporation film, a sputtering film, an amphipathic molecule film, a metal oxide film, a magnetism oxide film, an aluminum oxide film, a titanium oxide film and a tantalum oxide film.

5. The cantilever according to claim 1, wherein the electrodes are made of CoFeB.

6. The cantilever according to claim 1, wherein the at least one stress sensor is in a shape of a plate layered with the two electrodes and the electrical insulator.

7. The cantilever according to claim 6, wherein the at least one stress sensor is placed in a plane parallel to the direction of the at least one lever and perpendicular to the lever plane.

8. The cantilever according to claim 6, wherein the at least one stress sensor is placed in a plane perpendicular to the direction of the at least one lever and to the lever plane.

9. The cantilever according to claim 6, wherein the at least one stress sensor has a dimension between about 0.1 μm and 5.0 μm.

10. The cantilever according to claim 1, wherein the cantilever defines two or more levers therein having a common point of operation and two or more base ends, and there are two or more stress sensors provided for at least some of the two or more base ends.

11. The cantilever according to claim 1, wherein there are two or more stress sensors provided along the direction of the at least one lever.

12. The cantilever according to claim 1, wherein the at least one stress sensor is located at least in part in an unsupported portion of the cantilever.

13. A scanning probe microscope comprising the cantilever of claim 1.

14. An adsorption mass sensor comprising the cantilever of claim 1.

15. A detecting apparatus comprising a cantilever comprising: a lever portion comprising a point of operation; and
at least one stress sensor formed by laminating two electrodes with an electrical insulator therebetween and provided to the lever portion to receive the bending force of said lever, the at least one stress sensor being configured to be responsive to mechanical stress caused in the cantilever by a change of a vibration amplitude of the cantilever to flow a tunnel current therethrough, which is a function of the mechanical stress;
a vibrator operably connected to the cantilever and configured to vibrate the cantilever in a vibration state;
a differential detector configured to extract, from the tunnel current from the at least one stress sensor, a signal component representing mechanical stress of the cantilever unrelated to the vibrations caused by the vibrator; and
an analyzer configured to analyze the extracted signal component to determine an amount of displacement of the cantilever unrelated to the vibration state of the cantilever.

16. The detecting apparatus according to claim 15, wherein the detecting apparatus is a scanning probe microscope.

17. The detecting apparatus according to claim 16, further comprising a sample stage movable in an X-Y plane for the point of operation of the cantilever to scan a sample on the sample stage and also movable in a Z-direction for the point of operation to maintain a constant distance between the sample and a tip of the cantilever based on the amount of displacement.

18. The detecting apparatus according to claim 15, further comprising:
a reference cantilever provided with a stress sensor responsive to mechanical stress caused in the reference cantilever to flow a tunnel current therethrough, which is a function of the mechanical stress; and
a cancellation circuit configured to use the tunnel current from the reference cantilever to cancel circumstantial influences from the tunnel current from the cantilever.

19. The detecting apparatus according to claim 18, wherein the reference cantilever has a resonance frequency higher than that of the cantilever.

20. The detecting apparatus according to claim 18, wherein the reference cantilever has a thickness substantially equal to that of the cantilever and has an unsupported portion with a length as long as about 1/5 to about 4/5 of that of an unsupported portion of the cantilever.

21. The detecting apparatus according to claim 15, wherein the detecting apparatus is an adsorption mass sensor.

22. The detecting apparatus according to claim 21, wherein the point of operation of the cantilever is coated with a material which interacts with a target material.

23. A method for detection based on mechanical stress caused in a cantilever, comprising:
providing a stress sensor which is configured to be responsive to mechanical stress caused in the cantilever by a change of a vibration amplitude of the cantilever to flow a tunnel current therethrough, to a lever portion of the cantilever, the stress sensor formed by laminating two electrodes with an electrical insulator therebetween and provided to said lever portion to receive the bending force of said lever portion,
vibrating the cantilever to place the cantilever in a vibration state;
from the tunnel current from the stress sensor, extracting a signal component representing mechanical stress unrelated to the vibrations; and
analyzing the extracted signal component to determine an amount of displacement of the cantilever relative to the vibration state.

24. The method according to claim 23, further comprising controlling movement of a sample stage based on the amount of displacement relative to the vibration state to maintain a distance between a tip of the cantilever and the sample at a constant value.

25. The cantilever according to claim 1, wherein the vibrating portion comprises a piezoelectric element driven by a voltage that causes the cantilever to vibrate.

26. The cantilever according to claim 1,
wherein a sum of thicknesses of the two electrodes each having a substantially flat-plate shape and a thickness of the electrical insulator is lesser than the thickness of the at least one lever, and
wherein the at least one stress sensor is provided to the at least one lever between the first end portion and the second end portion at a position closer to the second end portion than the first end portion.

27. The detecting apparatus according to claim 15,
wherein the lever portion of the cantilever has a free end portion and at least one base end portion that is opposite to the free end portion in an extending direction of the lever portion,
wherein the point of operation is provided at the free end portion, wherein a sum of thicknesses of the two electrodes each having a substantially flat-plate shape and a thickness of the electrical insulator is lesser than the thickness of the lever portion, and wherein the at least one stress sensor is provided to the lever portion between the free end portion and the at least one base end portion at a position closer to the at least one base end portion than the free end portion.

28. The method according to claim 23, wherein the providing the stress sensor comprises providing the stress sensor, in which a sum of thicknesses of the two electrodes each having a substantially flat-plate shape and a thickness of the electrical insulator is lesser than the thickness of the lever portion, between a free end portion of the lever portion and at least one base end portion, which is opposite to the free end portion in an extending direction of the lever portion, of the lever portion at a position closer to the at least one base end portion that the free end portion.

* * * * *